US008460417B2

(12) United States Patent

Reid et al.

(10) Patent No.: US 8,460,417 B2
(45) Date of Patent: Jun. 11, 2013

(54) PORTABLE AIR FILTRATION SYSTEM

(75) Inventors: James K. Reid, Gahanna, OH (US); John Reid, Royal Oak, MI (US)

(73) Assignee: Great Lakes Air Systems, Inc., Sterling Heights, MI (US)

(*) Notice: Subject to any disclaimer, the term of this patent is extended or adjusted under 35 U.S.C. 154(b) by 270 days.

(21) Appl. No.: 12/616,387

(22) Filed: Nov. 11, 2009

(65) Prior Publication Data

US 2010/0115896 A1 May 13, 2010

Related U.S. Application Data

(60) Provisional application No. 61/113,346, filed on Nov. 11, 2008.

(51) Int. Cl.
*B01D 5/00* (2006.01)
*B01D 46/00* (2006.01)

(52) U.S. Cl.
USPC ................ 55/356; 55/385.2; 55/418; 55/419; 55/469

(58) Field of Classification Search
USPC .......... 55/DIG. 36, DIG. 18, 356, 472, 385.1, 55/485, 467, 385.4, DIG. 29, 418, DIG. 10, 55/419, 473, 315.1, 385.2; 95/273; 96/142, 96/265
See application file for complete search history.

(56) References Cited

U.S. PATENT DOCUMENTS

| | | | | | |
|---|---|---|---|---|---|
| 2,341,628 | A | * | 2/1944 | Koweindl | 454/49 |
| 3,442,230 | A | * | 5/1969 | Polen | 108/24 |
| 3,481,265 | A | * | 12/1969 | Scheel | 454/65 |
| 3,818,817 | A | * | 6/1974 | Nederman | 454/65 |
| 3,838,732 | A | * | 10/1974 | Overmyer | 164/404 |
| 4,158,462 | A | * | 6/1979 | Coral | 285/144.1 |
| 4,163,650 | A | * | 8/1979 | Watson et al. | 96/57 |
| 4,358,300 | A | * | 11/1982 | Schlapman et al. | 96/330 |
| D268,282 | S | * | 3/1983 | Wichmann et al. | D23/393 |
| 4,467,494 | A | * | 8/1984 | Jones | 15/353 |
| 4,512,245 | A | * | 4/1985 | Goldman | 96/142 |
| 4,567,623 | A | * | 2/1986 | Walton | 15/337 |
| 4,617,033 | A | * | 10/1986 | Strang | 96/1 |
| 4,702,827 | A | * | 10/1987 | Wenzel | 210/117 |
| 4,723,971 | A | * | 2/1988 | Caldas | 96/385 |
| 4,787,922 | A | * | 11/1988 | Kulitz | 96/57 |
| 4,860,644 | A | * | 8/1989 | Kohl et al. | 454/65 |
| 4,906,261 | A | * | 3/1990 | Mohajer | 96/225 |
| 4,968,333 | A | * | 11/1990 | Ellis et al. | 55/341.1 |
| 5,036,754 | A | * | 8/1991 | Simms et al. | 454/65 |
| 5,069,691 | A | * | 12/1991 | Travis et al. | 96/57 |
| 5,078,764 | A | * | 1/1992 | Lutterbach et al. | 55/356 |
| D325,252 | S | * | 4/1992 | Morris et al. | D23/364 |
| 5,125,939 | A | * | 6/1992 | Karlsson | 96/142 |
| 5,188,644 | A | * | 2/1993 | Landy | 95/268 |
| 5,192,343 | A | * | 3/1993 | Henry | 96/402 |

(Continued)

*Primary Examiner* — Duane Smith
*Assistant Examiner* — Sonji Turner
(74) *Attorney, Agent, or Firm* — Dickinson Wright PLLC

(57) ABSTRACT

A portable air filtration system used in industrial environments to filter and re-circulate fumes from a fume source includes a housing that filters the fumes from the fume source. The housing defines at least one housing inlet to receive the fumes and a housing outlet to dispense the fumes. A receiving assembly is releaseably engageable with the at least one housing inlet and includes a receiver inlet and a receiver outlet. The receiver outlet is in fluid communication with the at least one housing inlet. The receiver inlet receives the fumes from the fume source and transfers the fumes to the housing inlet. The system is capable of being modified between a plurality of configurations.

20 Claims, 2 Drawing Sheets

U.S. PATENT DOCUMENTS

| | | | | |
|---|---|---|---|---|
| 5,230,723 | A * | 7/1993 | Travis et al. | 96/57 |
| 5,271,750 | A * | 12/1993 | Abbott et al. | 96/400 |
| 5,281,246 | A * | 1/1994 | Ray et al. | 55/302 |
| 5,303,659 | A * | 4/1994 | Berlin et al. | 108/50.18 |
| 5,336,130 | A * | 8/1994 | Ray | 454/65 |
| 5,417,729 | A * | 5/1995 | Greenleaf, Sr. | 55/350.1 |
| 5,427,569 | A * | 6/1995 | Plymoth | 454/65 |
| 5,433,763 | A * | 7/1995 | Shagott et al. | 55/323 |
| 5,511,764 | A * | 4/1996 | Wonsetler | 266/49 |
| 5,527,217 | A * | 6/1996 | Engstrom | 454/63 |
| 5,536,206 | A * | 7/1996 | Bodmer et al. | 454/65 |
| 5,588,985 | A * | 12/1996 | Shagott et al. | 95/25 |
| 5,593,470 | A * | 1/1997 | Shagott et al. | 96/418 |
| 5,597,385 | A * | 1/1997 | Moerke | 96/416 |
| 5,637,124 | A * | 6/1997 | Diachuk | 55/342 |
| 5,702,493 | A * | 12/1997 | Everetts et al. | 55/356 |
| 5,722,110 | A * | 3/1998 | McIntyre et al. | 15/329 |
| 5,853,441 | A * | 12/1998 | Groen et al. | 55/350.1 |
| 5,934,991 | A * | 8/1999 | Rush | 454/187 |
| 5,951,725 | A * | 9/1999 | Vross et al. | 55/356 |
| 6,126,729 | A * | 10/2000 | Smith | 96/222 |
| 6,143,048 | A * | 11/2000 | Comproni et al. | 55/356 |
| 6,322,618 | B1 * | 11/2001 | Simms et al. | 96/428 |
| 6,395,047 | B1 * | 5/2002 | Smith | 55/385.2 |
| 6,402,613 | B1 * | 6/2002 | Teagle | 454/195 |
| 6,524,180 | B1 * | 2/2003 | Simms et al. | 454/65 |
| 6,537,337 | B2 * | 3/2003 | Mullins et al. | 55/361 |
| 6,607,573 | B1 * | 8/2003 | Chaurushia et al. | 55/356 |
| 6,616,720 | B1 * | 9/2003 | Smith | 55/385.2 |
| 6,626,984 | B1 * | 9/2003 | Taylor | 96/380 |
| 6,663,698 | B2 * | 12/2003 | Mishin et al. | 96/142 |
| 6,758,875 | B2 * | 7/2004 | Reid et al. | 55/385.2 |
| 6,783,563 | B1 * | 8/2004 | Eckhoff et al. | 55/356 |
| 6,792,878 | B2 * | 9/2004 | Cheng | 108/50.13 |
| 6,802,266 | B2 * | 10/2004 | Cheng | 108/50.13 |
| 6,846,236 | B2 * | 1/2005 | Gregoricka | 454/65 |
| 7,040,239 | B2 * | 5/2006 | Shelton et al. | 108/50.13 |
| 7,113,847 | B2 * | 9/2006 | Chmura et al. | 700/245 |
| 7,189,272 | B2 * | 3/2007 | Cheng | 55/385.2 |
| 7,296,321 | B2 * | 11/2007 | Cheng | 15/304 |
| D638,866 | S * | 5/2011 | Curry et al. | D15/133 |
| 7,954,779 | B2 * | 6/2011 | Coral et al. | 248/280.11 |
| 2002/0174506 | A1 * | 11/2002 | Wallach et al. | 15/319 |
| 2003/0029321 | A1 * | 2/2003 | Mishin et al. | 96/142 |
| 2003/0089087 | A1 * | 5/2003 | Reid et al. | 55/385.1 |
| 2003/0217674 | A1 * | 11/2003 | Cheng | 108/50.13 |
| 2004/0047776 | A1 * | 3/2004 | Thomsen | 422/186.07 |
| 2005/0055792 | A1 * | 3/2005 | Kisela et al. | 15/319 |
| 2006/0075936 | A1 * | 4/2006 | Shelton et al. | 108/50.13 |
| 2008/0305731 | A1 * | 12/2008 | Reid et al. | 454/65 |
| 2010/0115896 | A1 * | 5/2010 | Reid et al. | 55/356 |

* cited by examiner

PORTABLE AIR FILTRATION SYSTEM

CROSS REFERENCE TO RELATED APPLICATION

This utility patent application claims the benefit of U.S. Provisional Patent Application Ser. No. 61/113,346 filed Nov. 11, 2008, entitled “PORTABLE AIR FILTRATION SYSTEM,” the entire disclosure of the application being considered part of the disclosure of this application, and hereby incorporated by reference.

BACKGROUND OF THE INVENTION

1. Field of the Invention

The subject invention relates to air filtration systems and more particularly to portable air filtration systems that may be modified between different configurations based on use and used in industrial environments to filter and re-circulate the fumes from a fume source.

2. Description of the Prior Art

Many factories use machines or equipment, in welding for example, which create unhealthy fumes that must be filtered. Back draft assemblies, and positionable fume arms have been used near the source of the fumes, e.g. the work-piece being welded.

Positionable fume arms often include a small hood and a fume arm. The hood is positioned near the fume source and the fume arm transfers the fumes to the housing where they are filtered. A low horsepower motor is used to drive a fan in these positionable arm systems. The hood of a fume must be placed no farther than eighteen inches from the fume source in order to be effective. In certain applications, for example when a large work-piece is being welded, the hood must be consistently moved along the work-piece to maintain adequate filtration of the fumes. Welders often neglect to move the hood because of the effort required to do so and because it breaks their concentration on the welding operation. Neglecting to consistently move the hood to keep it within the eighteen inch operating range thereby compromises the quality of air in the work environment.

A back draft housing includes a housing inlet for receiving the fumes and a housing outlet for dispensing the fumes. A motor and a fan operatively connected to the motor generates suction at the housing inlet and propels the fumes out of the housing through the housing outlet. A filter is disposed in the housing for filtering particulates from the fumes.

Back draft housings are very effective when used in, for example, welding cells. The back draft housing is usually floor mounted and is very powerful so that it can pull fumes from the welding cell. The problem with back draft housings is that they cannot be effectively used on long welds. The distance between the back draft housing and the point of the weld has to be in the unit’s range, or it will be ineffective.

SUMMARY OF THE INVENTION AND ADVANTAGES

The subject invention relates to a portable air filtration system used in industrial environments to filter and re-circulate fumes from a fume source. The air filtration system includes a housing that filters the fumes from the fume source. The housing defines at least one housing inlet to receive the fumes and a housing outlet to dispense the fumes. A receiving assembly is releaseably engageable with the at least one housing inlet and includes a receiver inlet and a receiver outlet. The receiver outlet is in fluid communication with the at least one housing inlet. The receiver inlet receives the fumes from the fume source and transfers the fumes to the housing inlet. The system is capable of being modified between a plurality of configurations.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
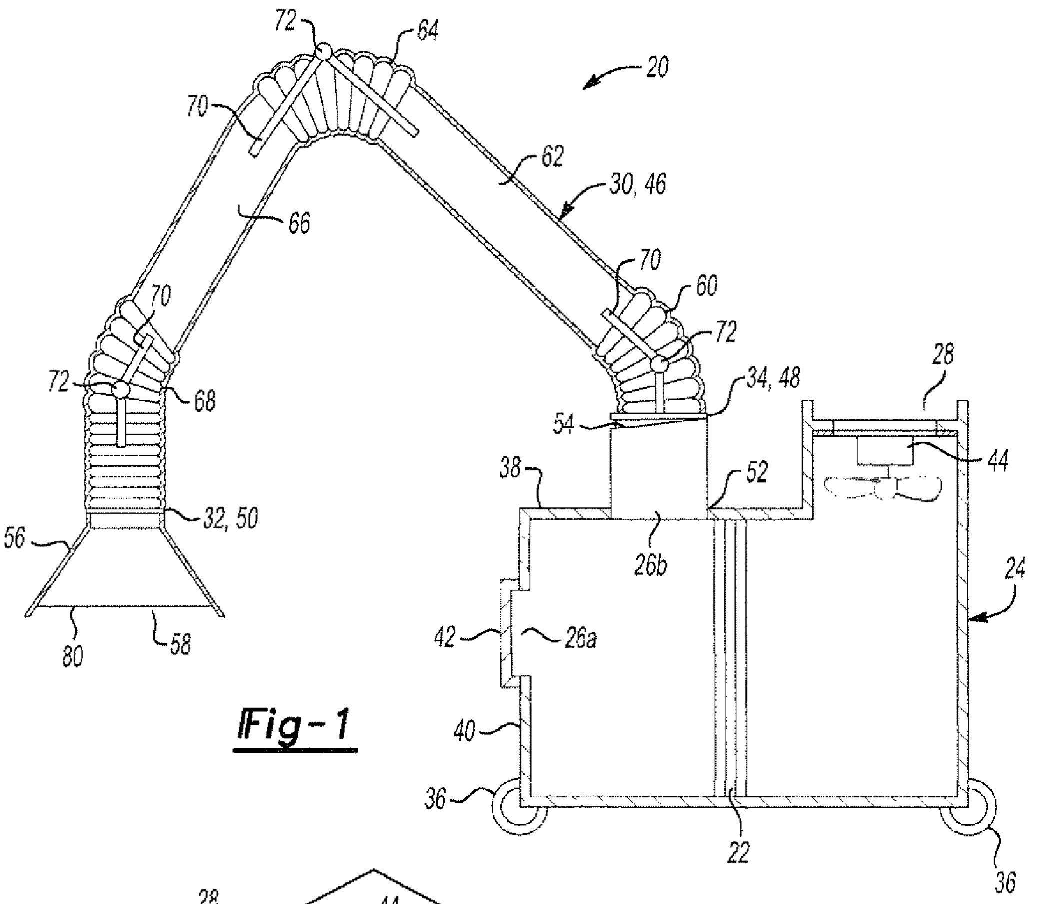
FIG. 1 is a partial cross-sectional side view of an exemplary air filtration system having a duct arm secured to a housing according to the subject invention.

Referring to the Figures, wherein like numerals indicate corresponding parts throughout the several views, a portable air filtration system 20 is generally shown. The subject invention relates to air filtration systems 20 and more particularly to portable air filtration systems 20 that may be modified between different configurations based on use and used in industrial environments to filter and re-circulate the fumes from a fume source.

The portable air filtration system 20 includes a housing 24 that filters the fumes from the fume source. The housing 24 defines at least one housing inlet 26*a*, 26*b* to receive the fumes and a housing outlet 28 to dispense the fumes. A receiving assembly 30 is releaseably engageable with the at least one housing inlet 26*a*, 26*b* and includes a receiver inlet 32 and a receiver outlet 34. The receiver outlet 34 is in fluid communication with the at least one housing inlet 26*a*, 26*b*. The receiver inlet 32 receives the fumes from the fume source and transfers the fumes to the housing inlet 26*a*, 26*b*. The system 20 is capable of being modified between a plurality of configurations.

The system 20 includes a housing 24 for filtering fumes. The housing 24 may be any shape and size known in the art. In the exemplary embodiment, the housing 24 is generally rectangular and includes a top and bottom face spaced from one another and connected by a plurality of side walls to define a housing chamber therein.

The housing 24 includes at least one wheel 36 to allow for movement of the housing 24 from one location to another. In the preferred embodiment, the housing 24 includes a plurality of wheels 36 secured to the housing 24, with each of the wheels 36 being disposed adjacent a corner of the housing 24. It should be appreciated that the assembly may include any wheel 36 known in the art and may further include any number of wheels 36 needed to move the housing 24.

The housing 24 defines at least one housing inlet 26*a*, 26*b* for receiving the fumes and a housing outlet 28 for dispensing the fumes. In the exemplary embodiment, the housing 24 defines a plurality of housing inlets 26*a*, 26*b* capable of receiving fumes from the fume source. Any one of the plurality of housing inlets 26*a*, 26*b* may be used to receive the fumes based on the configuration of the system 20. In the exemplary embodiment, the housing 24 includes two housing inlets, a first housing inlet 26*a* on a top face 38 of the housing 24 and a second housing inlet 26*b* on a front face 40 of the housing 24.

When the system 20 includes a plurality of housing inlets 26*a*, 26*b* and one of the housing inlets 26*a*, 26*b* is not in use, it may be covered with a housing plate 42 to block the flow of fumes into the housing 24 through the covered housing inlet 26*a*, 26*b*. The housing plate 42 is releaseably engageable with any one of the plurality of housing inlets 26*a*, 26*b* to block the flow of fumes into the housing 24 through the covered housing inlet 26*a*, 26*b*.

An electric motor 44 is disposed in the housing 24. A fan is operatively connected to the motor 44 for generating suction at the housing inlets 26*a*, 26*b* and for propelling the fumes out of the housing 24 through the housing outlet 28. At least one filter 22 is disposed in the housing 24 for removing particulates from the fumes. Additionally, a first spark arrester, as is well known to those of ordinary skill in the art, may be disposed in the housing 24 for arresting sparks and other combustible materials. It should be appreciated that the described system 20 is only exemplary, and any system 20 known in the art for moving fumes through a filter 22 or other cleaning mechanism may be used.

As shown in FIG. 1, the exemplary configuration of the receiver assembly is a duct arm 46 having a first end 48 in fluid communication with the housing inlet 26*b* of the housing 24. The duct arm 46 extends outwardly from the at least one housing inlet 26*a*, 26*b* to a distal end 50 for conveying fumes to the housing inlet 26*a*, 26*b*. In the exemplary embodiment, the system 20 includes a single duct arm 46 extending from the housing 24 but may include a plurality of duct arms 46 extending from the housing 24. The system 20 includes a duct plate 52 with a first swivel 54 that defines an opening to mate with the first end 48 of the duct arm 46. The first swivel 54 interconnects the housing inlet 26*a*, 26*b* of the housing 24 and the first end 48 of the duct arm 46 and allows for rotation of the duct arm 46 relative to the housing 24. The duct arm 46 may be of any length capable of reaching a fume source from the housing 24.

A hood 56 is disposed at the distal end 50 of the duct arm 46. The hood 56 defines a hood inlet 58 for receiving the fumes from the fume source. The hood inlet 58 may have any cross-section for receiving the fumes from the fume source, e.g. circular, hexagonal, etc.

In the exemplary embodiment, the duct arm 46 serially includes a first flexible section 60, a first rigid tube 62, a second flexible section 64, a second rigid tube 66, and a third flexible section 68. Each of the flexible sections 60, 64, 68 may be defined by a bellows tube. The first flexible section 60 extends from the first swivel 54, and the third flexible section 68 extends to the hood 56. A second swivel may be used to interconnect the hood 56 to the distal end 50 of the duct arm 46 and allow for rotation of the hood 56 relative to the duct a in 46.

The duct arm 46 of the exemplary embodiment may include control arms 70 for controlling the movement of the duct arm 46 relative to the housing 24. Control arms 70 could be used to interconnect the first swivel 54 and the first rigid tube 62, the first rigid tube 62 and the second rigid tube 66, and the second rigid tube 66 and the hood 56. The control arms 70 are pivotally connected together at a pivot 72 and include a control mechanism for controlling pivotal movement of the control arms 70 relative to one another for moving the first rigid tube 62 relative to the first swivel 54, the second rigid tube 66 relative to the first rigid tube 62, and the hood 56 relative to the second rigid tube 66.

The duct arm 46 and the hood 56 are often very heavy and difficult for a user to manually move. To assist the user, the control mechanisms may include springs or actuators to bias the control arms 70 and help the user move the hood 56 relative to the housing 24 more easily. Additionally, the control mechanisms support the duct arm 46 and the hood 56 and hold them in place when the user releases the hood 56. To support the duct arm 46 and hood 56, the control mechanisms may include friction disks or dampers to hold the duct arm 46 and hood 56 in a desired position for the user.

Figure 2:
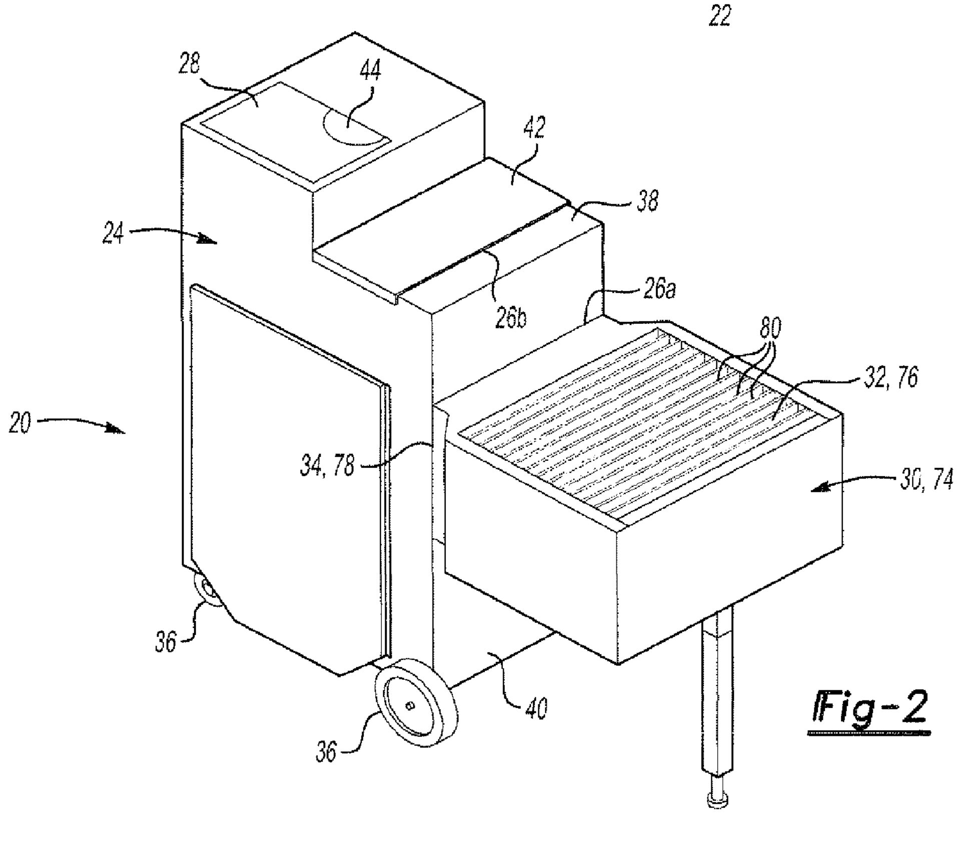
FIG. 2 is a perspective view of an exemplary air filtration system having an intake plenum secured to the housing at a first housing inlet according to the subject invention.
Figure 3:
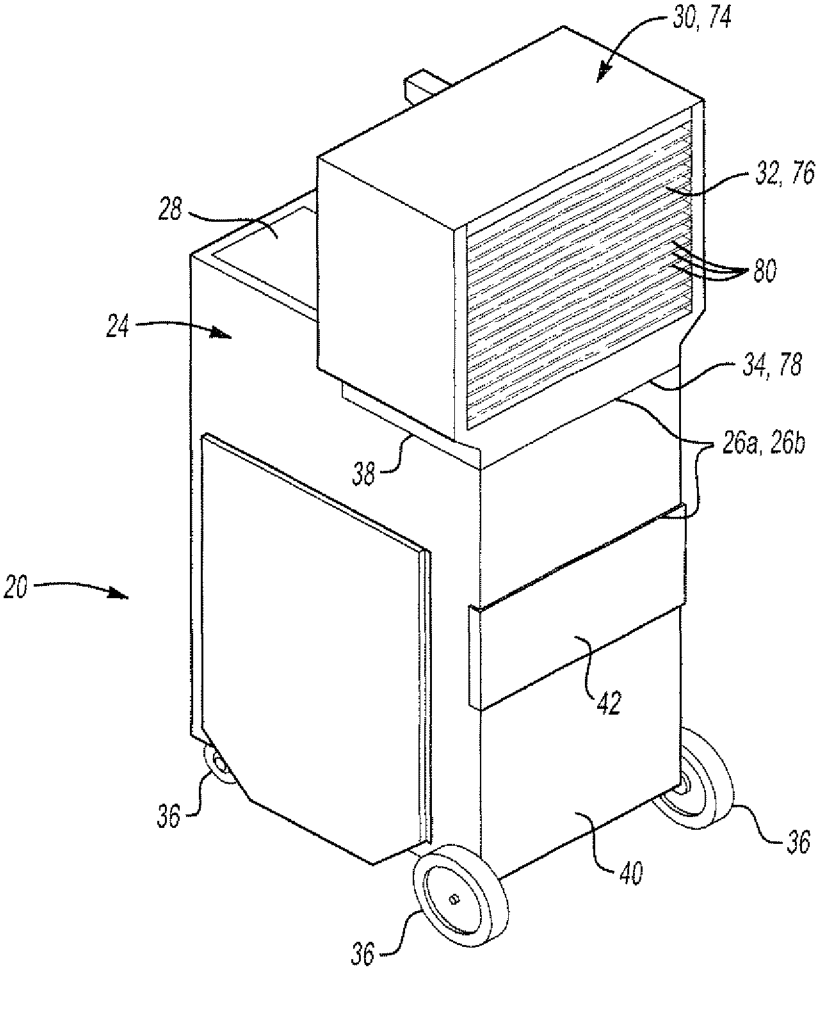
FIG. 3 is a perspective view of an exemplary air filtration system having the intake plenum secured to the housing at a second housing inlet according to the subject invention.

As shown in FIGS. 2 and 3, the receiver assembly is an attachable intake plenum 74 having a plenum inlet 76 and a plenum outlet 78. At least one filter 22 may be disposed in the intake plenum 74. In the exemplary embodiment, a spark arrester, as is well known to those of ordinary skill in the art, including a wire mesh is disposed in the intake plenum 74 for arresting sparks and other combustible materials, and a plurality of louvers 80 extend across and between opposite sides of the plenum inlet 76 for dispersing the fumes entering the intake plenum 74 from the fume source and for filtering out large materials from the fumes.

As shown in FIG. 2, the intake plenum 74, with the plenum inlet 76 facing upward, may be attached to housing inlet 26*a* disposed on the front face 40 of the housing 24 to create a downdraft flow. In the exemplary embodiment, the plenum outlet 78 is interconnected to the housing inlet 26*a* on the front face 40 while the housing plate 42 is disposed over the housing inlet 26*a* on the top face 38 to create the downdraft flow. At least one support leg may be pivotally attached to the back of the intake plenum 74 to support the intake plenum 74.

As shown in FIG. 3, the intake plenum 74, with the plenum inlet 76 facing outward, may be attached to housing inlet 26*b* disposed on the top face 38 of the housing 24 to create a backdraft flow. In the exemplary embodiment, the plenum outlet 78 is interconnected to the housing inlet 26*b* on the top face 38 while the housing plate 42 is disposed over the housing inlet 26*b* on the front face 40 to create the backdraft flow. At least one support leg may be pivotally attached to the top of the intake plenum 74 and pivoted forward to support a backdraft hood around the plenum intake.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed:

1. A portable air filtration system for use in industrial environments to filter and re-circulate fumes from a fume source comprising:

a housing defining a plurality of housing inlets for receiving the fumes and a housing outlet for dispensing the fumes;

a receiving assembly releaseably engaged to one of said housing inlets to establish fluid communication with said housing;

a housing plate releasably engaged over said other of said housing inlets for blocking the flow of fumes into said housing though said other of said housing inlets; and wherein said releasable engagement of said receiving assembly and said housing plate about said housing inlets can be interchanged to alter between a downdraft flow and a backdraft flow of fumes into said housing.

2. The system as set forth in claim 1 further including at least one wheel secured to said housing for moving said housing.

3. The system as set forth in claim 2 further including a plurality of wheels, each of said wheels being disposed adjacent a corner of said housing.

4. The system as set forth in claim 1 wherein one of said housing inlets is disposed on a front face of said housing and said other of said housing inlets is disposed on a top face of said housing.

5. The system as set forth in claim 1 further including a fan disposed in said housing and operatively connected to a motor for generating suction at said at least one housing inlet and for propelling the fumes out of said housing through said housing outlet.

6. The system as set forth in claim 1 further including a filter disposed in said housing for removing particulates from the fumes.

7. The assembly as set forth in claim 1 further including a plurality of louvers extending across said receiver inlet for dispersing the fumes entering said receiving assembly from the fume source and for filtering out large materials from the fumes.

8. The system as set forth in claim 1 wherein said receiving assembly includes a duct arm having a first end in fluid communication with one of said housing inlets and extending to a receiver inlet for receiving the fumes from the fume source.

9. The assembly as set forth in claim 8 wherein said duct arm includes at least one flexible section and at least one rigid tube.

10. The assembly as set forth in claim 9 wherein each of said at least one flexible sections is defined by a bellows tube.

11. The assembly as set forth in claim 9 wherein said duct arm serially includes a first flexible section and a first rigid tube and a second flexible section and a second rigid tube and a third flexible section.

12. The assembly as set forth in claim 8 further including a first swivel interconnecting one of said housing inlets of said housing and said first end of said duct arm for allowing rotation of said duct arm relative to said housing.

13. The system as set forth in claim 12 further including a duct plate releaseably engaged to one of said housing inlets and defining said first swivel for interconnecting one of said_housing inlets and said first end of said duct arm.

14. The system as set forth in claim 8 further including a hood having a hood outlet in fluid communication with said distal end of said duct arm and presenting a face defining a hood inlet for receiving the fumes from the fume source.

15. The assembly as set forth in claim 12 further including a hood having a hood outlet in fluid communication with said distal end of said duct arm and a second swivel interconnecting said hood outlet of said hood and said distal end of said duct arm for allowing rotation of said hood relative to said duct arm.

16. The system as set forth in claim 1 wherein said receiver assembly is an intake plenum having a plenum outlet in fluid communication with one of housing inlets and presenting a face defining plenum inlet for receiving the fumes for the fume source.

17. The system as set forth in claim 16 wherein one of said housing inlets is disposed on a front face of said housing and the other of said housing inlets is disposed on a top face of said housing.

18. The system as set forth in claim 17 wherein said intake plenum is releasably engaged to said housing inlet disposed on said front face of said housing and said plenum inlet faces upwardly to create the downdraft flow into said housing.

19. The system as set forth in claim 18 further including at least one support leg extending downwardly from said intake plenum for supporting said intake plenum.

20. The system as set forth in claim 17 wherein said intake plenum is releasably engaged to said housing inlet disposed on said top face of said housing and said plenum inlet faces outwardly to create the backdraft flow into said housing.

* * * * *